United States Patent
Eagan, Jr.

(10) Patent No.: US 10,814,896 B2
(45) Date of Patent: Oct. 27, 2020

(54) BARREL DRUM TRANSPORTER

(71) Applicant: Toyota Motor Engineering & Manufacturing North America, Inc., Erlanger, KY (US)

(72) Inventor: James O. Eagan, Jr., New Harmony, IN (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 213 days.

(21) Appl. No.: 14/982,551

(22) Filed: Dec. 29, 2015

(65) Prior Publication Data

US 2017/0183042 A1    Jun. 29, 2017

(51) Int. Cl.
*B62B 1/00* (2006.01)
*B62B 1/26* (2006.01)
*B62D 63/00* (2006.01)

(52) U.S. Cl.
CPC .............. *B62B 1/264* (2013.01); *B62D 63/00* (2013.01); *B62B 2203/44* (2013.01); *B62B 2203/72* (2013.01)

(58) Field of Classification Search
CPC .. A61G 3/062; B62B 2203/72; B62B 2203/74
USPC .......................... 414/408, 509, 529, 555, 621
See application file for complete search history.

(56) References Cited

U.S. PATENT DOCUMENTS

| | | | |
|---|---|---|---|
| 4,318,661 A | 5/1982 | Helm | |
| 5,009,565 A | 4/1991 | Esau | |
| 5,222,853 A * | 6/1993 | Carson | B65F 1/004 414/408 |
| 5,236,298 A | 8/1993 | Lehman | |
| 5,344,278 A | 9/1994 | Emig, Jr. | |
| 5,361,644 A | 11/1994 | Nedele et al. | |
| 5,898,378 A | 4/1999 | Berg et al. | |
| 2006/0153667 A1 * | 7/2006 | Pruteanu | B65F 3/046 414/408 |
| 2009/0155032 A1 * | 6/2009 | Hedley | B60B 29/002 414/426 |
| 2015/0151772 A1 * | 6/2015 | Lin | H01L 21/67724 414/509 |

FOREIGN PATENT DOCUMENTS

| | | | | |
|---|---|---|---|---|
| CN | 202910870 U | 5/2013 | | |
| EP | 0372491 B1 | 4/1993 | | |
| EP | 3069956 A1 * | 9/2016 | ............... | B62B 3/02 |

* cited by examiner

*Primary Examiner* — Saul Rodriguez
*Assistant Examiner* — Willie Berry, Jr.
(74) *Attorney, Agent, or Firm* — Christopher G. Darrow; Darrow Mustafa PC

(57) ABSTRACT

A drum transporter that can be used to move a drum from a first bed at a first location to a second bed at a second location is described. The drum transporter can be coupled to a drive cart and powered thereby. The drum transporter is operable to grab a drum on the first bed and pull the drum onto a support bed of the drum transporter for subsequent movement to the second location. The drum transporter is operable to push the drum off the support bed and onto the second bed.

20 Claims, 11 Drawing Sheets

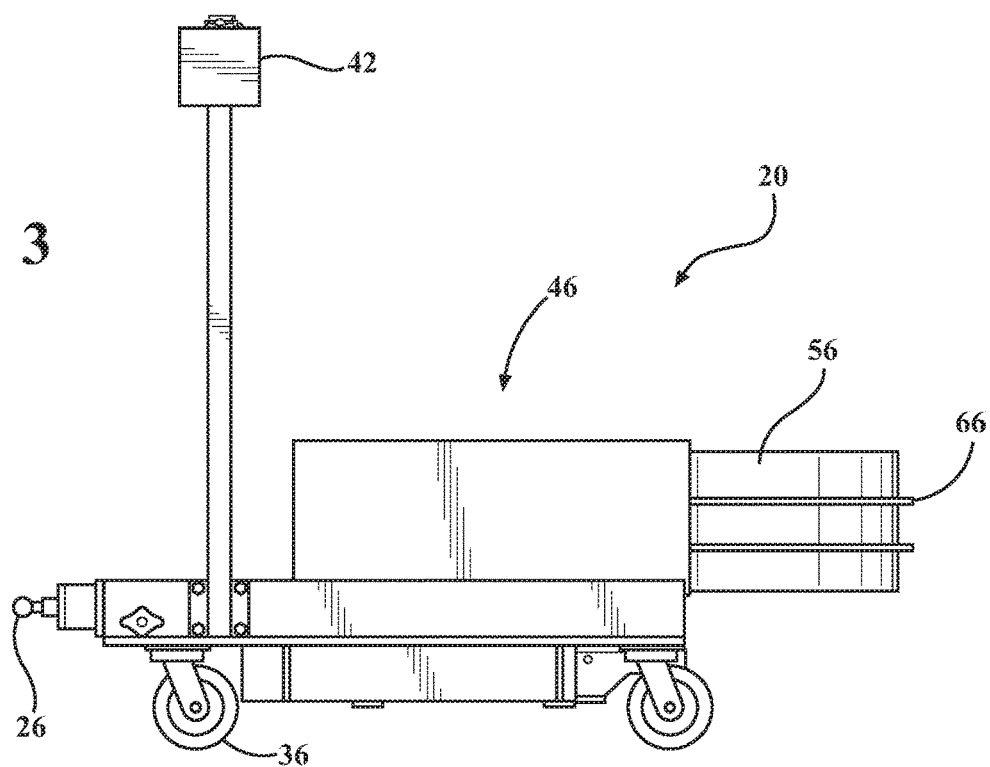
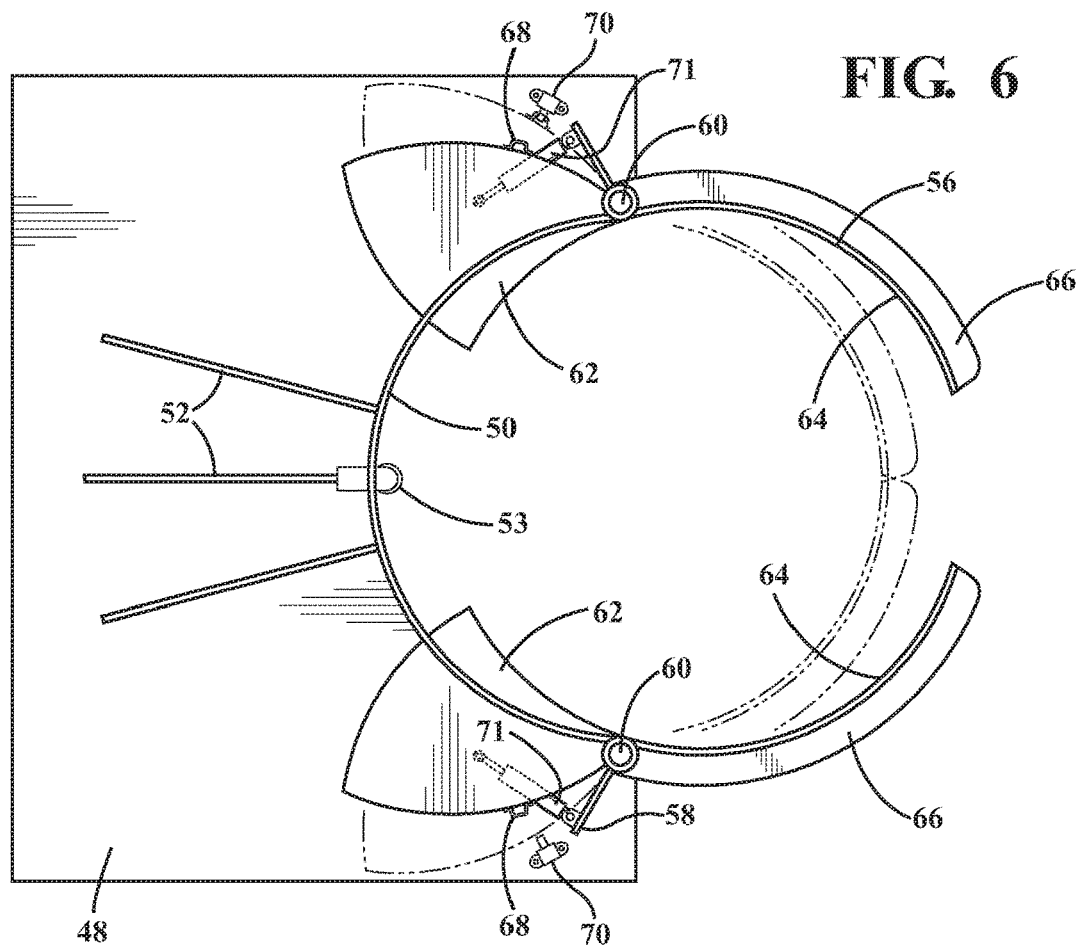

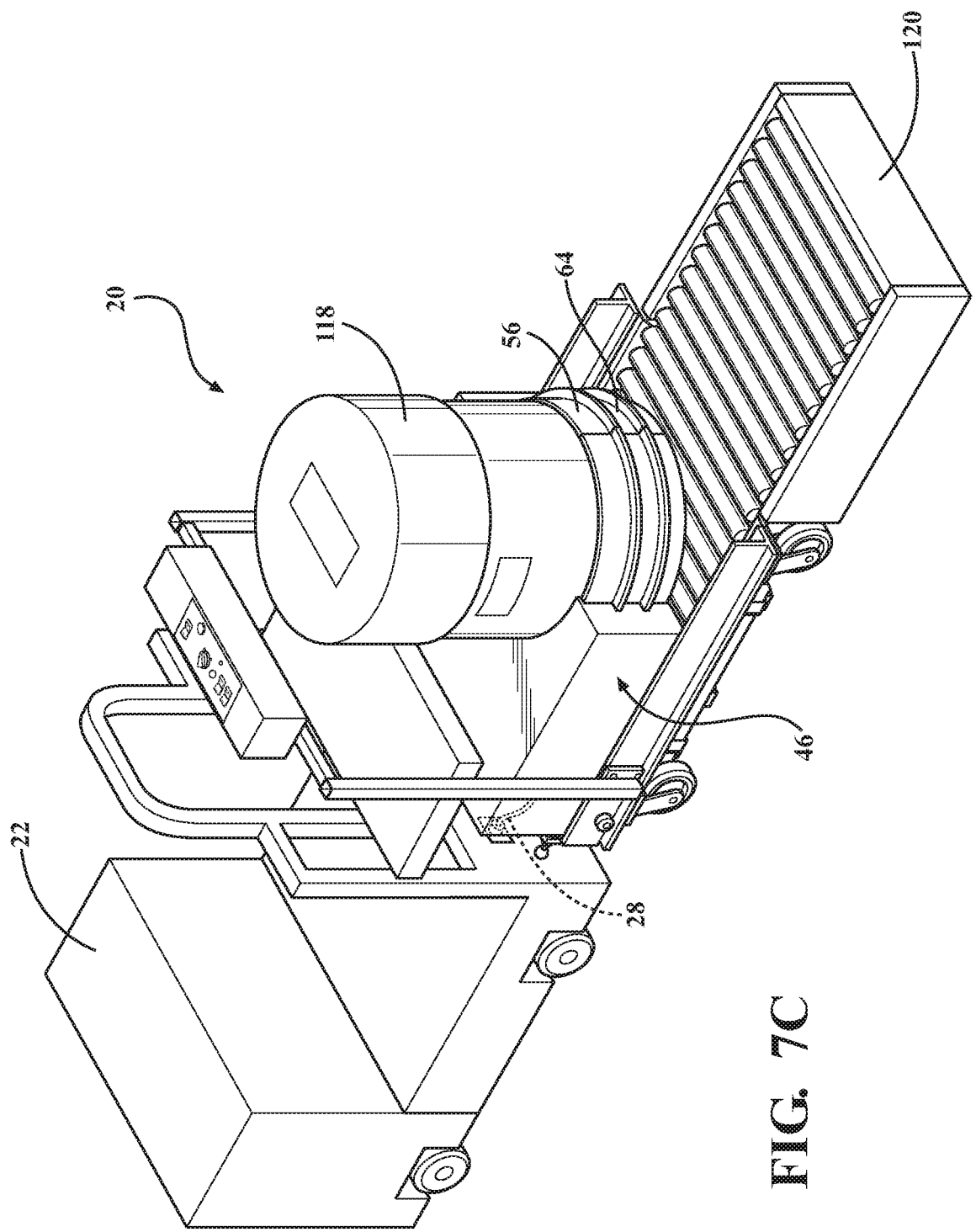

BARREL DRUM TRANSPORTER

FIELD

The subject matter described herein relates in general to transporters and, more particularly, to a barrel drum transporter.

BACKGROUND

Barrel drums are used in factories to hold parts and supplies to support the manufacturing activities. The barrel drums can be heavy when full. In some cases, the full barrel drums can weigh 900 pounds.

To support the manufacturing activities, full barrel drums are transported to the appropriate locations in the factory for use and empty barrel drums are removed. The transport of the barrel drums along the factory floor can be difficult due to the weight and can be through high traffic areas—areas where good visibility is desired. The barrel drums are moved by manually operated dollies or by fork trucks. The manually operated dollies can be strenuous to operate while the fork trucks may limit visibility.

SUMMARY

The present disclosure is directed to a drum transporter that is coupled to a drive cart and powered thereby. The drum transporter is operable to grab a drum on a first bed and move it to a support bed of the drum transporter for subsequent movement to a desired location where the drum transporter is operable to push the drum off the support bed and onto a second bed.

In one respect, the present disclosure is directed to a drum transporter operable to be coupled to a drive cart and move a drum from one location to another. The drum transporter includes a support bed, a gripping assembly and a drive system. The gripping assembly is horizontally moveable relative to the support bed between an extended position and a retracted position. The gripping assembly has a pair of arms that move between an open position and a closed position. The arms when in the open position are operable to receive a drum therebetween and when in the closed position are operable to at least partially circumscribe a portion of an exterior of a drum. The drive system is coupled to the gripping assembly and is operable to drive movement of the gripping assembly between the extended and retracted positions. The drive system is powered by the drive cart. The gripping assembly is operable to engage with a drum and move the drum horizontally onto and off of the support bed.

In another respect, the present disclosure is directed to a drum transporting system operable to move a drum from one location to another. The system includes a drive cart coupled to a drum transporter and operable to move the drum transporter between locations. The drum transporter includes a support bed, a gripping assembly and a drive system. The gripping assembly is horizontally moveable relative to the support bed between an extended position and a retracted position. The gripping assembly has a pair of arms that move between an open position and a closed position. The arms when in the open position are operable to receive a drum therebetween and when in the closed position are operable to at least partially circumscribe a portion of an exterior of a drum. The drive system is coupled to the gripping assembly and is operable to drive movement of the gripping assembly between the extended and retracted positions. The drive system is powered by the drive cart. The gripping assembly is operable to engage with a drum and move the drum horizontally onto and off of the support bed.

In yet another respect, the present disclosure is directed to a method of transporting a barrel from a first location on a first bed to a second location on a second bed. The method includes transporting a drum transporter to a first location adjacent a barrel to be transported that is on a first bed. The drum transporter has a support bed, a gripping assembly, and a drive system. The method includes moving the gripping assembly horizontally relative to the support bed from a retracted position above the support bed to an extended position wherein a pair of arms of the gripping assembly extend horizontally beyond the support bed and over the first bed such that the barrel is disposed between the arms and then closing the pair of arms around the barrel. The method includes moving the gripping assembly horizontally from the extended position to the retracted position thereby pulling the barrel off of the first bed and onto the support bed. The method includes transporting the drum transporter to a second location adjacent a second bed. The method includes moving the gripping assembly from the retracted position to the extended position thereby pushing the barrel drum off of the support bed and onto the second bed and then opening the pair of arms. The method includes moving the gripping assembly horizontally from the extended position to the retracted position thereby leaving the barrel on the second bed. The steps of transporting the drum transporter are done with a drive cart. The steps of moving the gripping assembly are done with the drive system which is powered by the drive cart.

BRIEF DESCRIPTION OF THE DRAWINGS

FIG. 3 is a side view of the drum transporter of FIG. 1.

FIG. 6 is a top plan view of the gripping assembly.

FIGS. 7A-7C are perspective views of the drum transporter in various states of operation.

DETAILED DESCRIPTION

Figure 1:
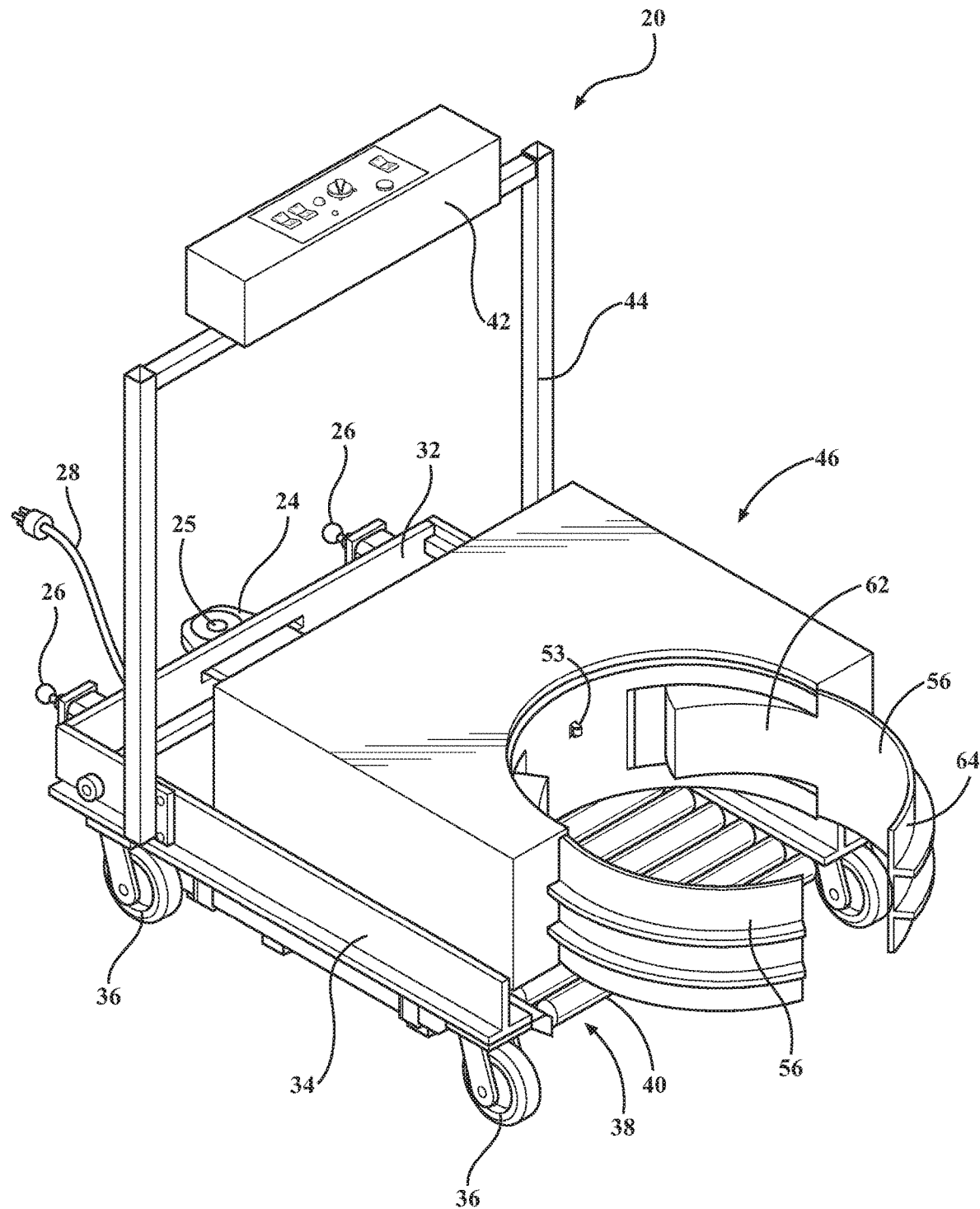
FIGS. 1 and 2 are perspective views of an exemplary drum transporter.
Figure 2:
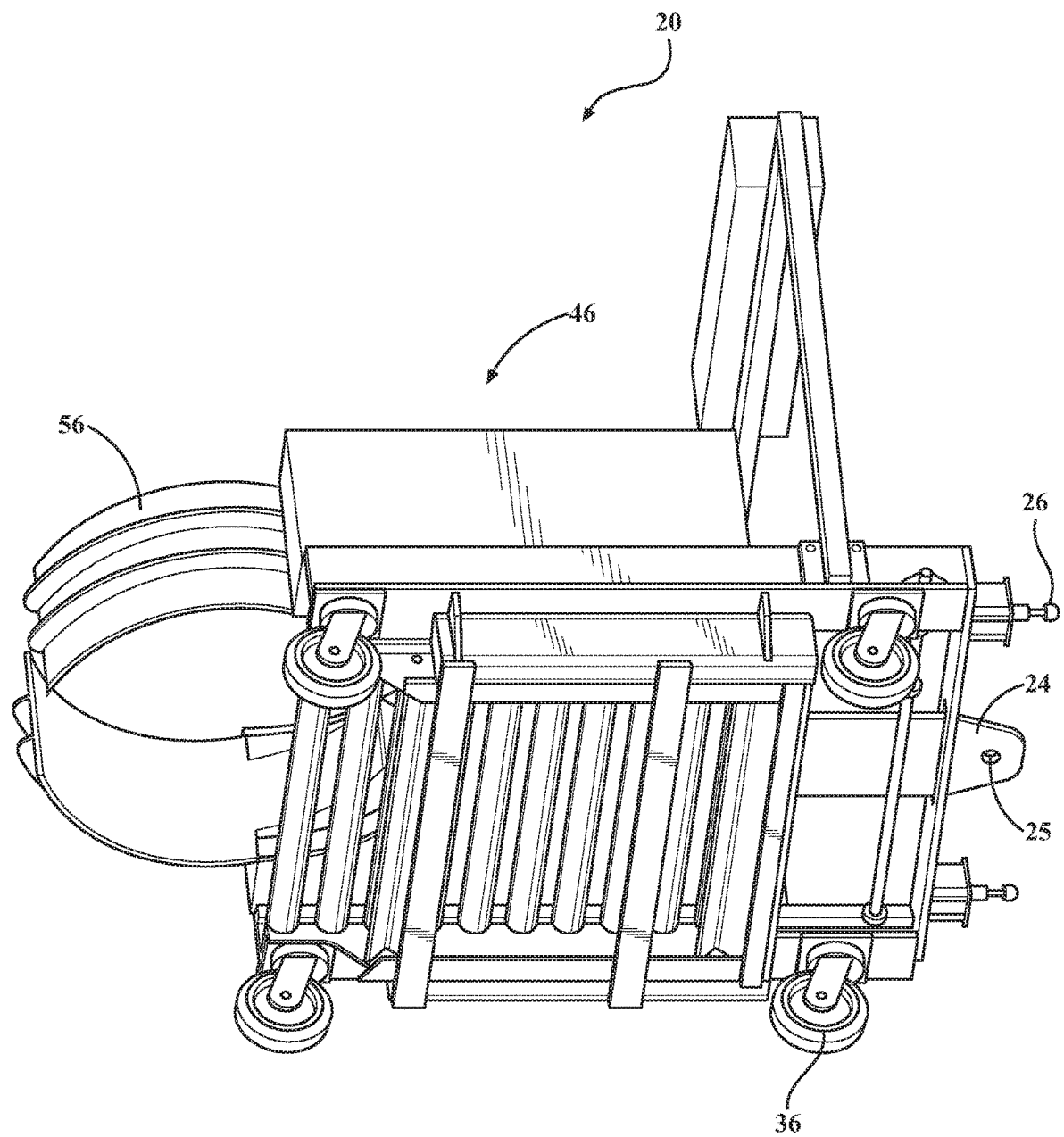
Figure 4:
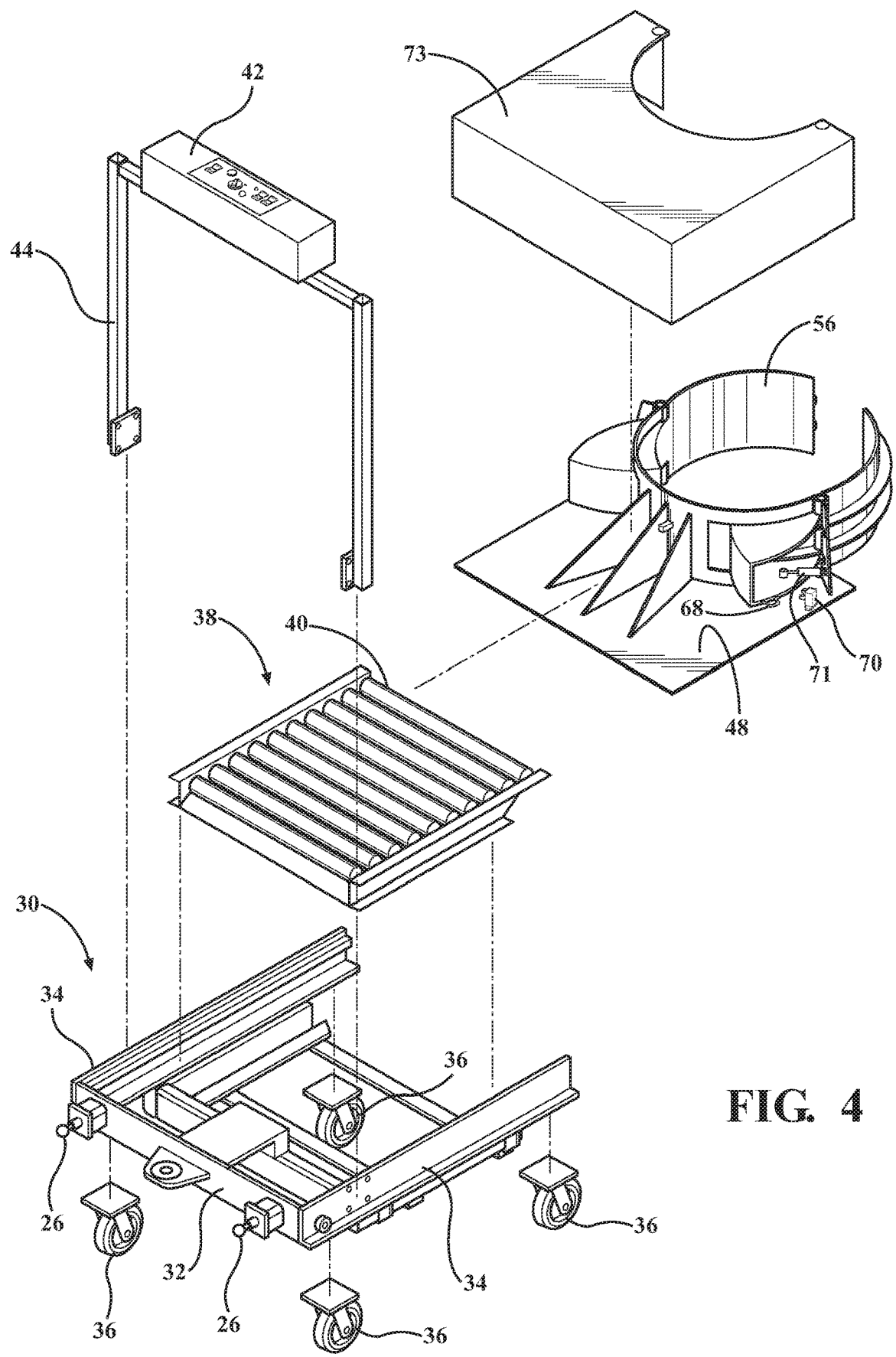
FIG. 4 is an exploded view of the drum transporter of FIG. 1.
Figure 5:
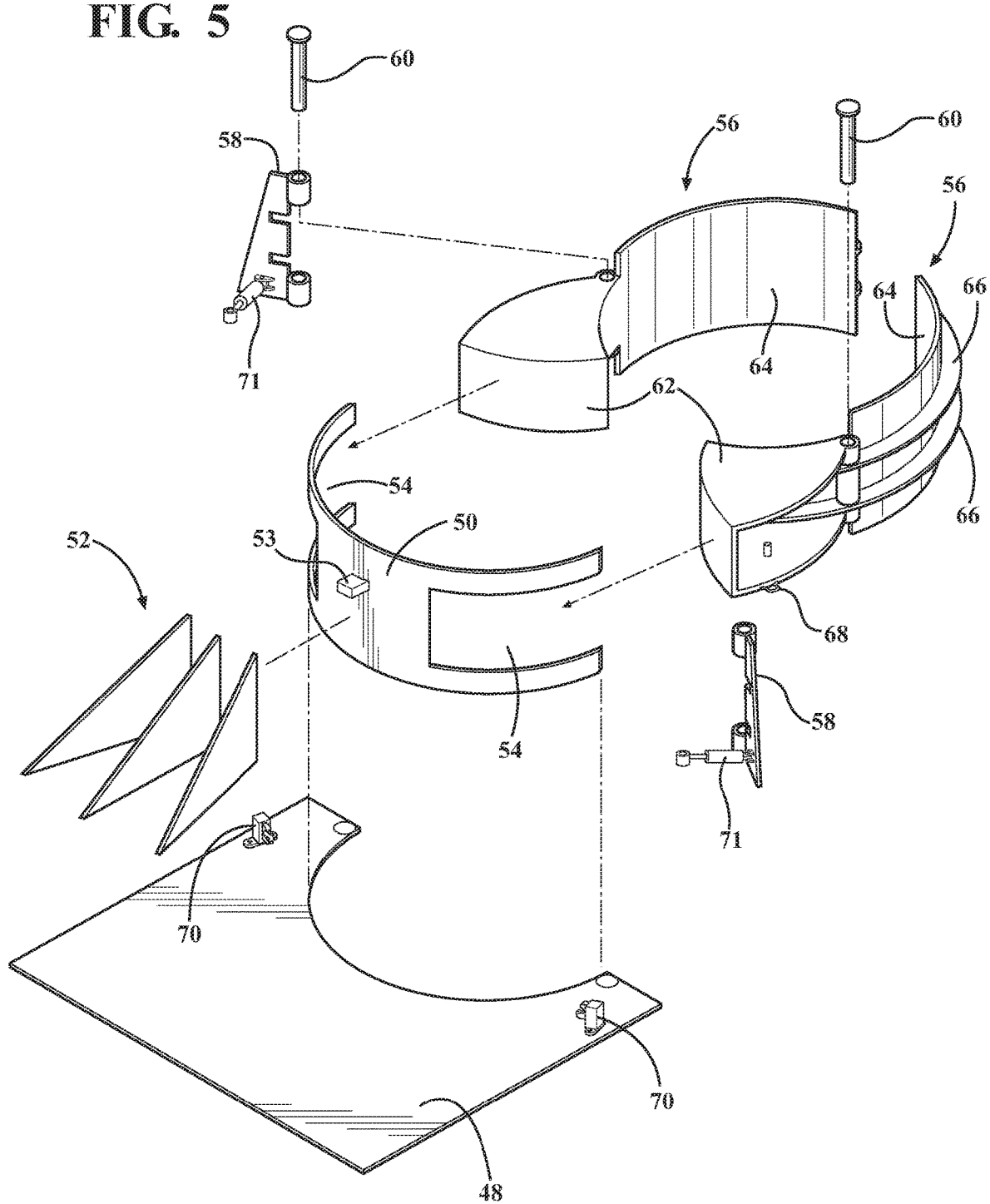
FIG. 5 is an exploded view of a gripping assembly of the drum transporter.

This detailed description relates to a barrel drum transporter (drum transporter) that operatively connects with an electric drive cart, such as a 24 volt tugger. The drum transporter receives electric power from the drive cart and includes an electrically operated gripping assembly that moves horizontally to engage with and move a drum between a stationary roller stand and a roller bed of the drum transporter. The drive cart can move the drum transporter and a drum on the roller bed to a desired location for off-loading. The gripping assembly includes two arcuate pivoting arms that can circumferentially engage with a portion of the exterior of the drum. The arms can be biased to the open position and can be locked in the closed position to secure the drum on the drum transporter. The operation can require the use of both hands of the operator. The drum transporter may provide a visual indication of the locking of the arms in the closed position. The drum transporter may prohibit the unlocking of the arms until the gripping assembly is in a desired horizontal position, such as fully extended. The drum transporter may prohibit drive cart operation until the arms are locked in the closed position and fully retracted.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 7A:
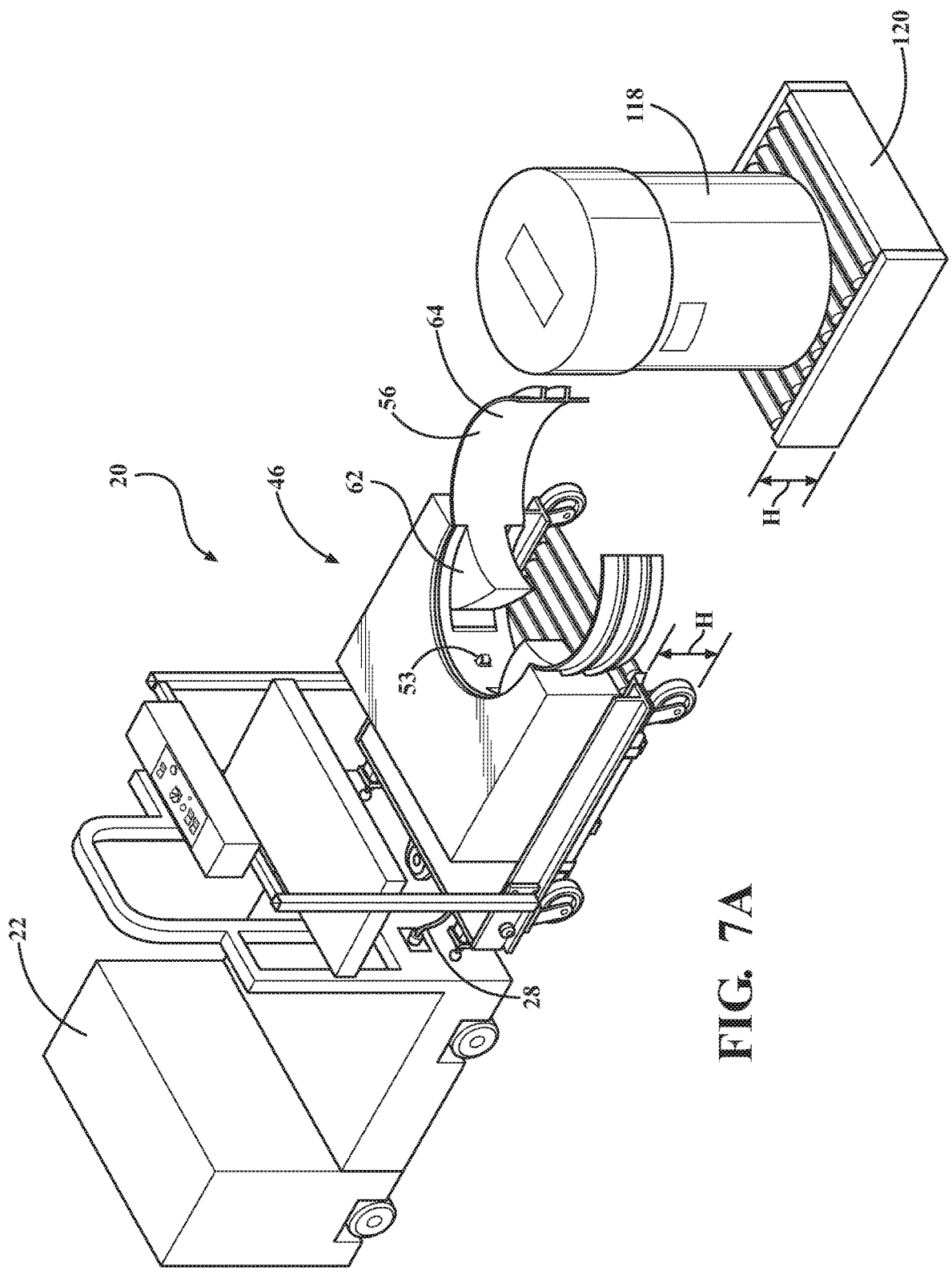

Referring to FIGS. 1 and 7, an example of a drum transporter 20 which can be operatively coupled to a drive cart 22 is shown. As used herein, "drive cart" means any form of motorized transport. In one or more implementations, the drive cart 22 can be a 24 volt electric drive cart, such as an electric tugger. Drum transporter 20 can be configured with a coupler 24 having opening 25 that allows drum transporter 20 to be mechanically coupled to drive cart 22 with an appropriate coupler pin. Coupler 24 may allow some relative rotation between drum transporter 20 and drive cart 22 during movement of drive cart 22. Drum transporter 20 may include a pair of spaced apart guide posts 26 that engage with the drive cart 22 to maintain a desired orientation of drum transporter 20 relative to drive cart 22 during movement of drive cart 22. Drum transporter 20 is electrically coupled with and receives power from drive cart 22 via an electrical cable 28.

Referring to FIGS. 1-6, drum transporter 20 includes a base 30 having a cross member 32 and a pair of spaced apart rails 34. Base 30 may be supported by a plurality of wheels 36, such as four casters. A support bed 38 may include a plurality of rollers 40 and is configured to be supported from base 30 and support the weight of a fully loaded drum thereon. A control panel 42 is affixed on a support structure 44 that may extend upwardly from base 30.

Drum transporter 20 includes a gripping assembly 46 that is horizontally moveable relative to a top surface of support bed 38. Gripping assembly 46 includes a base plate 48 and a wall 50 extending vertically therefrom. A plurality of buttresses 52 may be included to support wall 50 relative to base plate 48. A drum detection device 53 may be disposed in wall 50. Drum detection device 53 may take a variety of forms, such as a movable arm with a roller that moves from a projected position to a flush position when a drum is fully loaded on gripping assembly 46. It should be appreciated that drum detection device 53 may take other forms that are suitable to be activated by the presence of a drum fully loaded on gripping assembly 46. Wall 50 includes a pair of openings 54. A pair of arms 56 may be pivotally coupled to wall 50, such as at opposite ends of wall 50, with hinges 58 and pins 60. Arms 56 and wall 50 may be arcuate in shape such that the shape is similar to or matches that of the exterior surface of a drum for which the drum transporter 20 is configured to move. Arms 56 may each include a wedge portion 62 and a grabbing portion 64. Hinges 58 may couple with arms 56 at or near the junction of wedge portions 62 and grabbing portions 64 such that each wedge portion 62 is operable to move through an associated opening 54 in wall 50 during rotational movement of arm 56 relative to wall 50. Arms 56 may include reinforcing structures, such as ribs 66, on an outer surface thereof. Wedge portions 62 may each include a striker 68 that is operable to engage with corresponding latch 70 to hold arms 56 in a closed position, as described below. Latches 70 may be power operated latches such that arms 56 remain secured (locked) in the closed position until latches 70 are commanded to open via an electrical voltage supplied thereto via user activation. Latches 70 may operate independently of one another. Gripping assembly 46 may include a biasing member 71 operatively connected to each arm 56 and hinge 58. Alternatively, biasing member 71 may be connected to wall 50 or base plate 48 instead of hinge 58. Biasing members 71 may bias each arm 56 to an open position. Biasing members 71 may be gas struts or springs by way of example. Gripping assembly 46 may include a cover 73 that covers a majority of gripping assembly 46.

Figure 10:
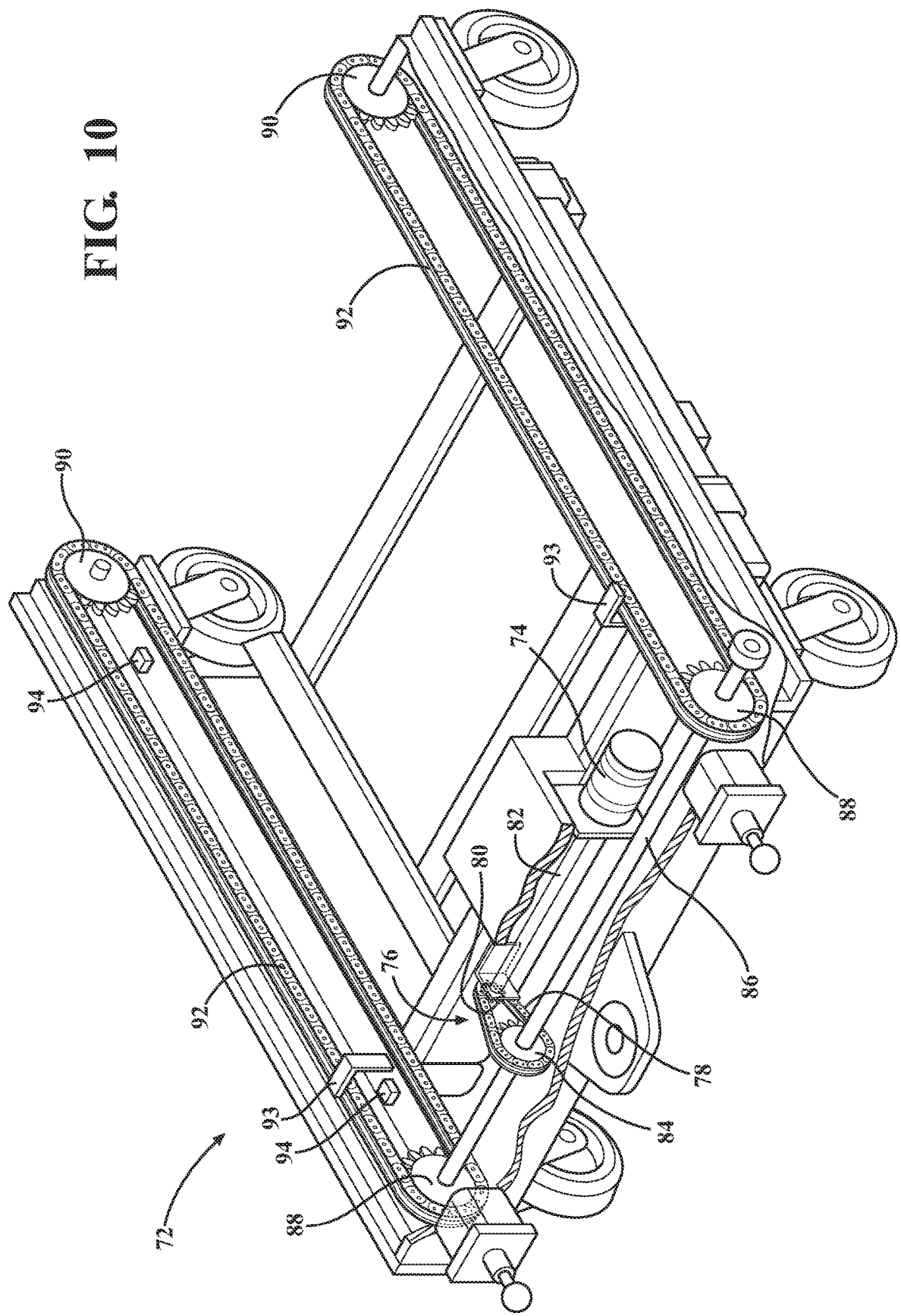
FIG. 10 is a partial view of the drum transporter of FIG. 1 showing an exemplary drive system.

Referring to FIG. 10, drum transporter 20 includes a drive system 72 that is operable to move gripping assembly 46 horizontally relative to support bed 38. Drive system 72 may include an electric motor 74 that is coupled to a reduction gear assembly 76 via a chain or belt 78. Reduction gear assembly 76 is operable to convert the rotational speed of motor 74 into a desired rotational drive speed for gripping assembly 46. For example, an output gear 80 can be coupled to an output shaft 82 of motor 74. A reduction gear 84 may be coupled to a drive shaft 86 and chain or belt 78 may couple output gear 80 to reduction gear 84. Rotation of output shaft 82 is thereby translated into rotation of drive shaft 86. Drive shaft 86 may extend between rails 34 adjacent cross member 32. A pair of drive gears 88 may be coupled to opposite end portions of drive shaft 86 on an interior side of rails 34. A pair of gears 90 may be rotationally coupled to forward end portions of rails 34. A drive chain 92 may be coupled to a drive gear 88 and a gear 90 associated with each rail 34. Operation of motor 74 can thereby drive movement of drive chains 92 relative to each rail 34. Opposing sides of gripping assembly 46 may each be coupled to a drive chain 92 by couplers 93 such that operation of motor 74 drives horizontal movement of gripping assembly 46 along rails 34 relative to support bed 38 via the movement of drive chain 92. Limit sensors/switches 94 can be coupled to a rail 34 and provide a signal and/or stop operation of motor 74 when gripping assembly 46 has reached desired extended and retracted positions. By way of example, one of the couplers 93 can be configured to engage with limit sensors/switches 94 when a desired position of gripping assembly 46 is obtained. The positioning of limit sensors/switches 94 can thereby determine the fully extended and fully retracted positions of gripping assembly 46.

Figure 8:
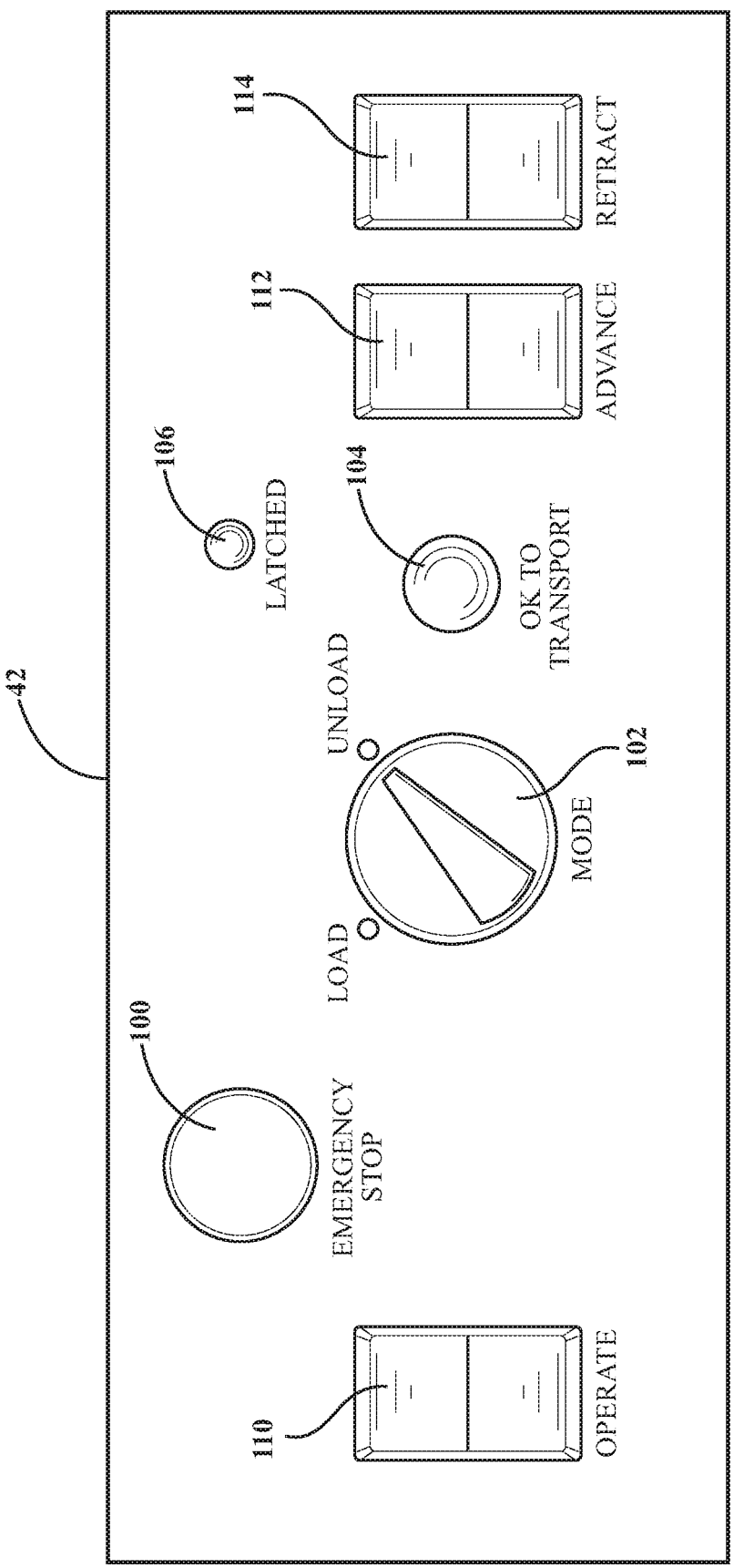
FIG. 8 is a view of an exemplary control panel of the drum transporter.
Figure 9:
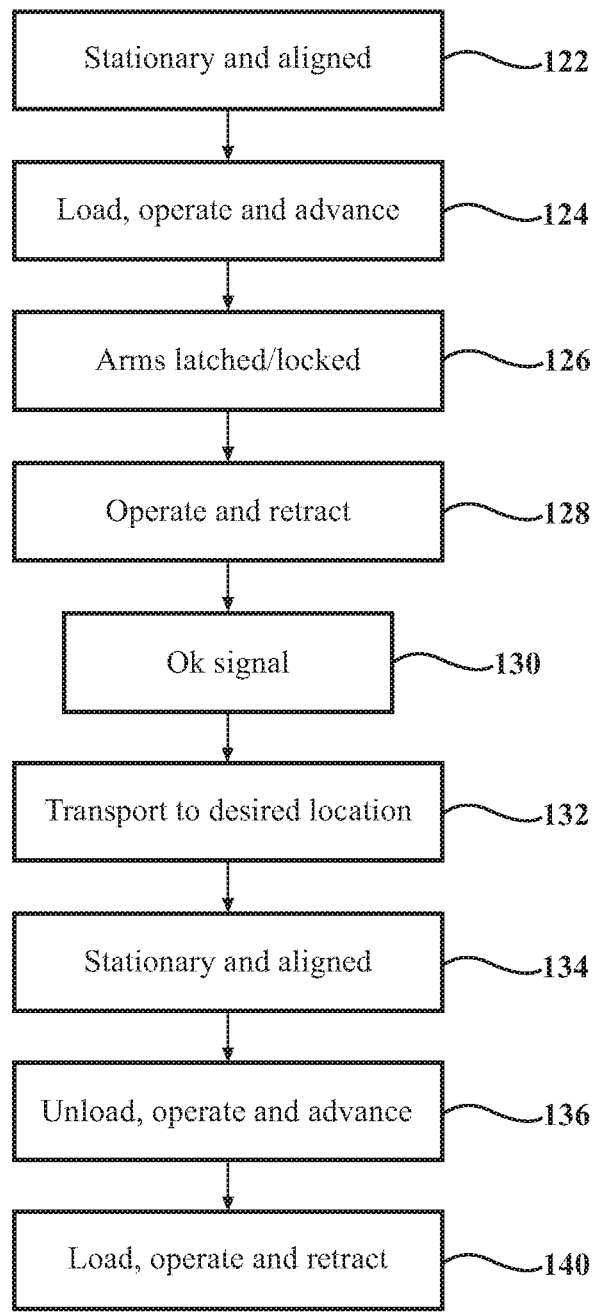
FIG. 9 is an exemplary flow chart of the operation of the drum transporter.

Referring to FIG. 8, control panel 42 includes an emergency stop switch 100 that may be manually operated to stop operation of drum transporter 20. A mode selector switch 102 allows a user to select either a LOAD or UNLOAD mode of operation of drum transporter 20. A visual indicator light 104 is operable to signal when it is OK to transport.

Indicator light 104 can illuminate when gripping assembly 46 is fully retracted with both arms 56 in a latched/locked condition and the presence of a drum is detected by drum detection device 53. If only a single arm 56 is latched/locked, indicator light 104 will not illuminate. Indicator light 104 can thereby provide a visual indicator to the user that the load drum is secured on drum transporter 20 and it is OK to move drum transporter 20 with drive cart 22. A visual indicator light 106 is operable to signal (illuminate) when both arms 56 are latched/locked in the closed position. Gripping assembly 46 is caused to advance/retract through a two-handed operation of the user. Control panel 42 includes a left side operate switch 110 and a right side advance switch 112 and a right side retract switch 114. To operate gripping assembly 46 a user will simultaneously press and hold down both a left hand switch (i.e. operate switch 110) and a right hand switch (i.e. advance switch 112 or retract switch 114). To move gripping assembly 46 from a retracted to an extended position, the user will depress both operate switch 110 and advance switch 112. To move gripping assembly 46 from an extended position to a retracted position, the user will depress both operate switch 110 and retract switch 114. The user will hold down the appropriate left hand and right hand switches until gripping assembly 46 is in the desired position. Operate switch 110 and the appropriate advance or retract switch 112, 114 may be required to be simultaneously depressed within a specified time period to move gripping assembly 46. Limit sensors/switches 94 will operate to stop the advancing and retracting of gripping assembly 46 when the fully extended and fully retracted positions are achieved.

Figure 7B:
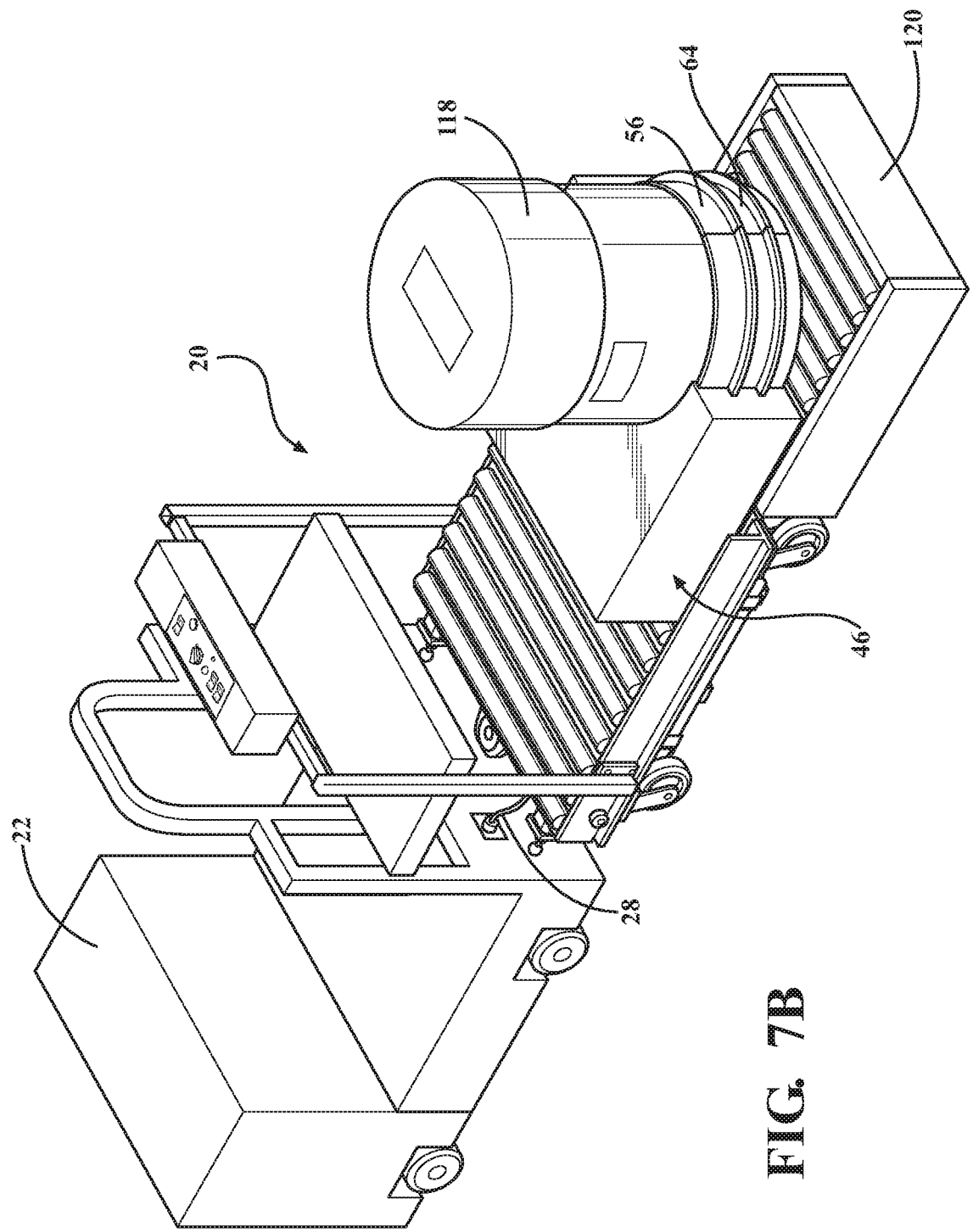

Referring now to FIGS. 7A-C and 9, exemplary operation of drum transporter 20 is shown and described. Drum transporter 20 is operable to grasp a drum 118 on a stationary bed 120. Stationary bed 120 may be a roller bed that allows drum 118 to be rolled there along. Support bed 38 has a vertical height H that is approximately the same as the vertical height H of stationary bed 120. The similar height H allows drum 118 to be moved between stationary bed 120 and support bed 38 by gripping assembly 46. To operate drum transporter 20, the user positions an empty drum transporter 20 adjacent to and aligned with stationary bed 120 and is parked in that location, as indicated in block 122. Next, as indicated in block 124, the user then selects the load mode via mode selector switch 102 and simultaneously depresses both operate and advance switches 110, 112. Gripping assembly 46 then moves toward drum 118 until the fully extended position is realized. As gripping assembly 46 advances toward drum 118, arms 56 are in a fully open position until the wedge portions 62 contact the exterior surface of drum 118. Continued advancing of gripping assembly 46 results in arms 56 moving toward a closed position as the force of drum 118 against wedge portions 62 overcomes the force of biasing members 71 and arms 56 pivot relative to wall 50. Next, as indicated in block 126, when gripping assembly 46 reaches the fully extended position, arms 56 have moved to a closed position and strikers 68 engage with latches 70 to latch/lock arms 56 in the closed position, such as shown in FIG. 7B. Arms 56 can fully or partially circumscribe an exterior of drum 118 when in the closed position. Drum 118 also contacts and activates drum detection device 53 when fully positioned in gripping assembly 46. Visual indicator light 106 can illuminate once arms 56 are latched/locked it the closed position.

Next, as indicated in block 128, the user releases operate and advance switches 110, 112 and then simultaneously depresses both operate and retract switches 110, 114. Gripping assembly 46 then moves, along with drum 118, from the fully extended position toward drive cart 22 until the fully retracted position is realized with drum 118 on support bed 38, such as that shown in FIG. 7C. During retraction, grabbing portions 64 of arms 56 pull drum 118 along stationary bed 120 and support bed 38. When drum 118 is on support bed 38 with arms 56 in the close position, gripping assembly 46 is fully retracted, and drum detection device 53 is activated, indicator light 104 will illuminate, as indicated in block 130, informing the user that drive cart 22 is ready to be operated to move drum transporter 20 to a desired location, as indicated in block 132. Operation of drive cart 22 may be inhibited until the conditions to illuminate indicator light 104 have been realized. The user will transport drum 118 to the desired location, as indicated in block 132, and position drum transporter 20 adjacent to and aligned with another stationary bed 120 upon which it is desired to position drum 118, as indicated in block 134.

Next, as indicated in block 136, drum 118 can be offloaded by the user selecting the unload mode via mode selector switch 102 and simultaneously depressing both operate and advance switches 110, 112. Gripping assembly 46 then moves toward the stationary bed 120 until the fully extended position is realized and drum 118 is supported by stationary bed 120, such as shown in FIG. 7B. Next, the user will release operate and advance switches 110, 112 and then simultaneously depress both operate and retract switches 110, 114 as indicated in block 140. Arms 56 will be automatically unlock based on mode selector switch 102 being in the unload mode and retract switch 114 being depressed simultaneously with operate switch 110. With arms 56 unlatched/unlock, gripping assembly 46 can be moved from the fully extended position to the fully retracted position while leaving drum 118 on stationary bed 120.

The term "operatively connected" as used throughout this description, can include direct or indirect connections, including connections without direct physical contact. It will be appreciated that arrangements described herein can provide numerous benefits, including one or more of the benefits mentioned herein. For example, arrangements described herein can provide user an automated method of moving barrel drums that can provide improved visibility over other automated methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A drum transporter, comprising:
   a base having a pair of spaced apart rails;
   an onboard roller bed supported by the base between the rails defining a horizontal onboard support plane;
   a gripping assembly supported on the rails defining a horizontal engagement plane overhead the onboard support plane and an engagement direction in the engagement plane, and having a pair of arms with an un-tilted orientation relative to the onboard roller bed moveable in the engagement plane between an open position and a closed position, the arms when in the open position operable to receive an upright drum therebetween and when in the closed position operable to at least partially circumscribe an upright drum received therebetween, the gripping assembly moveable along the rails relative to the onboard roller bed along the engagement direction between an extended position and a retracted position, the gripping assembly when in the extended position carrying the arms beyond the footprint of the onboard roller bed with the un-tilted orientation and when in the retracted position carrying the arms within the footprint of the onboard roller bed with the un-tilted orientation; and a drive system coupled between the onboard roller bed and the gripping assembly, the drive system operable to move the gripping assembly between the extended position and the retracted position, whereby the gripping assembly is operable via the arms to engage with an upright drum and roll an engaged upright drum between the onboard roller bed and an off-board roller bed defining a horizontal off-board support plane aligned with the onboard support plane.

2. The drum transporter of claim 1, wherein the arms include a rear portion, the arms when in the open position operable to contact an upright drum at the rear portion during receipt therebetween, the contact causing the arms to move to the closed position and thereby at least partially circumscribe the upright drum received therebetween.

3. The drum transporter of claim 1, wherein the arms include respective forward grabbing portions, the arms when in the closed position operable to pullingly roll an at least partially circumscribed upright drum received therebetween using the forward grabbing portions.

4. The drum transporter of claim 1, further comprising at least one latch operable to lock the arms in the closed position.

5. The drum transporter of claim 1, further comprising at least one biasing member biasing the arms to the open position.

6. The drum transporter of claim 1, wherein the arms when moving between the open position and the closed position pivot about respective separate pivot axes.

7. The drum transporter of claim 1, wherein the drive system includes an electric motor and a drive member that moves in response to rotation of the electric motor, the drive member coupled to the gripping assembly such that operation of the electric motor causes the gripping assembly to move between the extended position and the retracted position.

8. The drum transporter of claim 1, further comprising a control panel coupled to the drive system, the control panel requiring two handed operation as a condition to the drive system moving the gripping assembly between the extended position and the retracted position.

9. A drum transporting system comprising:
a drive cart; and
a drum transporter configured for selective coupling to the drive cart, the drum transporter including:
    a base having a pair of spaced apart rails;
    an onboard roller bed supported by the base between the rails defining a horizontal onboard support plane;
    a gripping assembly supported on the rails defining a horizontal engagement plane overhead the onboard support plane and an engagement direction in the engagement plane, and having a pair of arms with an un-tilted orientation relative to the onboard roller bed moveable in the engagement plane between an open position and a closed position, the arms when in the open position operable to receive an upright drum therebetween and when in the closed position operable to at least partially circumscribe an upright drum received therebetween, the gripping assembly moveable along the rails relative to the onboard roller bed along the engagement direction between an extended position and a retracted position, the gripping assembly when in the extended position carrying the arms beyond the footprint of the onboard roller bed with the un-tilted orientation and when in the retracted position carrying the arms within the footprint of the onboard roller bed with the un-tilted orientation; and
    a drive system coupled between the onboard roller bed and the gripping assembly, the drive system powered by the drive cart and operable when powered by the drive cart to move the gripping assembly between the extended position and the retracted position, whereby the gripping assembly is operable via the arms to engage with an upright drum and roll an engaged upright drum between the onboard roller bed and an off-board roller bed defining a horizontal off-board support plane aligned with the onboard support plane.

10. The drum transporting system of claim 9, wherein the arms include a rear portion, the arms when in the open position operable to contact an upright drum at the rear portion during receipt therebetween, the contact causing the arms to move to the closed position and thereby at least partially circumscribe the upright drum received therebetween.

11. The drum transporting system of claim 9, wherein the arms include respective forward grabbing portions, the arms when in the closed position operable to pullingly roll an at least partially circumscribed upright drum received therebetween using the forward grabbing portions.

12. The drum transporting system of claim 9, wherein gripping assembly includes at least one latch operable to lock the arms in the closed position and at least one biasing member biasing the arms to the open position.

13. The drum transporting system of claim 9, wherein the arms when moving between the open position and the closed position pivot about respective separate pivot axes.

14. A method of transporting a drum, comprising:
with an upright drum supported on a first off-board support bed defining a horizontal first off-board support plane, transporting, with a drive cart, a drum transporter having an onboard support bed defining a horizontal onboard support plane, a gripping assembly defining a horizontal engagement plane overhead the onboard support plane and an engagement direction in the engagement plane, and having a pair of arms with an un-tilted orientation relative to the onboard support bed moveable in the engagement plane between an open position and a closed position, and moveable relative to the onboard support bed along the engagement direction between an extended position and a retracted position, and a drive system coupled between the onboard support bed and the gripping assembly, to the first off-board support bed, and thereby aligning the onboard support plane with the first off-board support plane;

operating the drive system to move the gripping assembly from the retracted position to the extended position to carry the arms beyond the footprint of the onboard support bed with the un-tilted orientation to thereby receive the upright drum therebetween;

closing the arms to thereby at least partially circumscribe the upright drum received therebetween;

operating the drive system to move the gripping assembly from the extended position to the retracted position to carry the arms within the footprint of the onboard support bed with the un-tilted orientation and thereby pull the upright drum off of the first off-board support bed and onto the onboard support bed;

transporting, with the drive cart, the drum transporter to a second off-board support bed defining a horizontal second off-board support plane, and thereby aligning the onboard support plane with the second off-board support plane;

operating the drive system to move the gripping assembly from the retracted position to the extended position to carry the arms beyond the footprint of the onboard support bed with the un-tilted orientation and thereby push the upright drum off of the onboard support bed and onto the second off-board support bed;

opening the arms; and operating the drive system to move the gripping assembly from the extended position to the retracted position to thereby leave the upright drum on the second off-board support bed.

15. The method of claim 14, further comprising:

contacting rear portions of the arms when in the open position with the upright drum when the gripping assembly is moving from the retracted position toward the extended position, the contact causing the arms to move to the closed position and thereby at least partially circumscribe the upright drum received therebetween; and pulling the upright drum off the first off-board support bed and onto the onboard support bed using respective forward grabbing portions of the arms when in the closed position as the gripping assembly is moving from the extended position to the retracted position.

16. The method of claim 15, further comprising:

locking the arms in a closed position once closed; and unlocking the arms when the gripping assembly is moved to the extended position and the upright drum is on the second off-board support bed.

17. The method of claim 16, further comprising biasing the arms to the open position.

18. The method of claim 14, wherein the steps of closing the arms and opening the arms each include pivoting the arms about respective separate pivot axes.

19. The method of claim 14, wherein the drive system includes an electric motor and a drive member that moves in response to rotation of the electric motor, the drive member coupled to the gripping assembly such that operation of the electric motor causes the gripping assembly to move between the extended position and the retracted position.

20. The method of claim 14, wherein the steps of operating the drive system to move the gripping assembly require a user to simultaneously activate two different actuators, each with a different hand.

* * * * *